US012437947B2

(12) United States Patent
Dong et al.

(10) Patent No.: US 12,437,947 B2
(45) Date of Patent: Oct. 7, 2025

(54) CONTACTOR ARRANGEMENT FOR EXTINGUISHING AN ELECTRIC ARC

(71) Applicants: Tyco Electronics Technology (SIP) Ltd., Suzhou (CN); Tyco Electronics (Shanghai) Co., Ltd., Shanghai (CN)

(72) Inventors: Hongjiang (Summer) Dong, Suzhou (CN); Yong Jia, Shanghai (CN); Qiaoxu Pan, Suzhou (CN)

(73) Assignees: Tyco Electronics (Shanghai) Co., Ltd., Shanghai (CN); Tyco Electronics Technology (SIP) Ltd., Suzhou (CN)

( * ) Notice: Subject to any disclaimer, the term of this patent is extended or adjusted under 35 U.S.C. 154(b) by 112 days.

(21) Appl. No.: 18/462,821

(22) Filed: Sep. 7, 2023

(65) Prior Publication Data

US 2024/0087826 A1 Mar. 14, 2024

(30) Foreign Application Priority Data

Sep. 8, 2022 (CN) ......................... 202222385971.5

(51) Int. Cl.
*H01H 50/04* (2006.01)
*H01H 50/38* (2006.01)

(52) U.S. Cl.
CPC .......... *H01H 50/045* (2013.01); *H01H 50/38* (2013.01)

(58) Field of Classification Search
None
See application file for complete search history.

(56) References Cited

U.S. PATENT DOCUMENTS 5,546,061 A * 8/1996 Okabayashi ........... H01H 9/443 335/126
2005/0151606 A1* 7/2005 Nishida .................. H01H 9/443 335/128
2015/0022291 A1* 1/2015 Kashimura .............. H01H 9/46 218/148

FOREIGN PATENT DOCUMENTS

CN 112582215 A * 3/2021 ............. H01H 50/54

OTHER PUBLICATIONS

Machine translation of CN-112582215-A (Year: 2021).*

* cited by examiner

*Primary Examiner* — Bernard Rojas
(74) *Attorney, Agent, or Firm* — Barley Snyder

(57) ABSTRACT

A contactor comprises an insulation outer housing, a pair of static terminals, a movable terminal, a first magnetic conductor, a static bracket, a second magnetic conductor and an elastic member. The pair of static terminals are arranged in the insulation outer housing and are stationary relative to the insulation outer housing. The movable terminal is also arranged in the insulation outer housing and is movable between a closed position in contact with the static terminal and an opened position separated from the static terminal. The first magnetic conductor is fixed to the movable terminal to move synchronously with the movable terminal. The static bracket is arranged within the insulation outer housing and is stationary relative to the insulation outer housing. The second magnetic conductor is floatably supported in the static bracket by the elastic member.

16 Claims, 4 Drawing Sheets

CONTACTOR ARRANGEMENT FOR EXTINGUISHING AN ELECTRIC ARC

CROSS-REFERENCE TO RELATED APPLICATION

This application claims the benefit of Chinese Patent Application No. CN202222385971.5 filed on Sep. 8, 2022, in the State Intellectual Property Office of China, the whole disclosure of which is incorporated herein by reference.

FIELD OF THE INVENTION

The present invention relates to an electrical contactor.

BACKGROUND

High voltage DC contactors are key devices in many electrical equipment (such as the electrical system of new energy vehicles). In the prior art, when a coil of a contactor is energized, a main contact of the contactor is in a closed state, which can effectively connect to and pass current. When the coil of the contactor deenergized, the main contact of the contactor is in an opened state, which can achieve the effect of breaking the current. In a normal operating state of a high-voltage circuit connected to the contactor, the current carried by the main contact of the contactor is relatively stable. However, when abnormal conditions such as short circuits occur in the high-voltage circuit, the resulting abnormal current will have a certain impact on the bearing capacity and stability of the main contact of the contactor. When surge currents occur between the movable and static contacts, the contactors will fail, causing unpredictable serious consequences.

At the same time, the future development trend of new energy vehicles is high current and high voltage. When the high voltage system malfunctions, the surge current will reach 5 kA or even more than 15 kA. When such a large current flows through the movable and static contacts, a strong electric repulsion force (including Lorentz force and Holm force) will be generated in the main contact circuit. The direction of the electric repulsion force is opposite to the contact direction of the movable and static contacts, which will cause the movable and static contacts to spring apart, this can lead to incorrect operation.

In the prior art, the current carrying capacity of high-voltage DC contactors and their ability to withstand large currents for a short period of time is limited are desired to be improved. More specifically, the ability to withstand short circuit current of existing contactors is generally within 2500-5000 A, which cannot meet the technical requirements of the future market. Some manufacturers have improved the contact structure of contactors to increase the product's ability to withstand short circuit current. However, these types of improved structures often have certain technical defects. For example, although the ability to withstand short-circuit current is improved, the ability of the contactor to cut off current and turn on current each decrease.

SUMMARY

According to an embodiment of the present disclosure, an improved contactor comprises an insulation outer housing, a pair of static terminals, a movable terminal, a first magnetic conductor, a static bracket, a second magnetic conductor and an elastic member. The pair of static terminals are arranged in the insulation outer housing and are stationary relative to the insulation outer housing. The movable terminal is also arranged in the insulation outer housing and is movable between a closed position in contact with the static terminal and an opened position separated from the static terminal. The first magnetic conductor is fixed to the movable terminal to move synchronously with the movable terminal. The static bracket is arranged within the insulation outer housing and is stationary relative to the insulation outer housing. The second magnetic conductor is floatably or movably supported in the static bracket by the elastic member.

BRIEF DESCRIPTION OF THE DRAWINGS

The invention will now be described by way of example with reference to the accompanying Figures, of which.

DETAILED DESCRIPTION OF THE EMBODIMENTS

Figure 1:
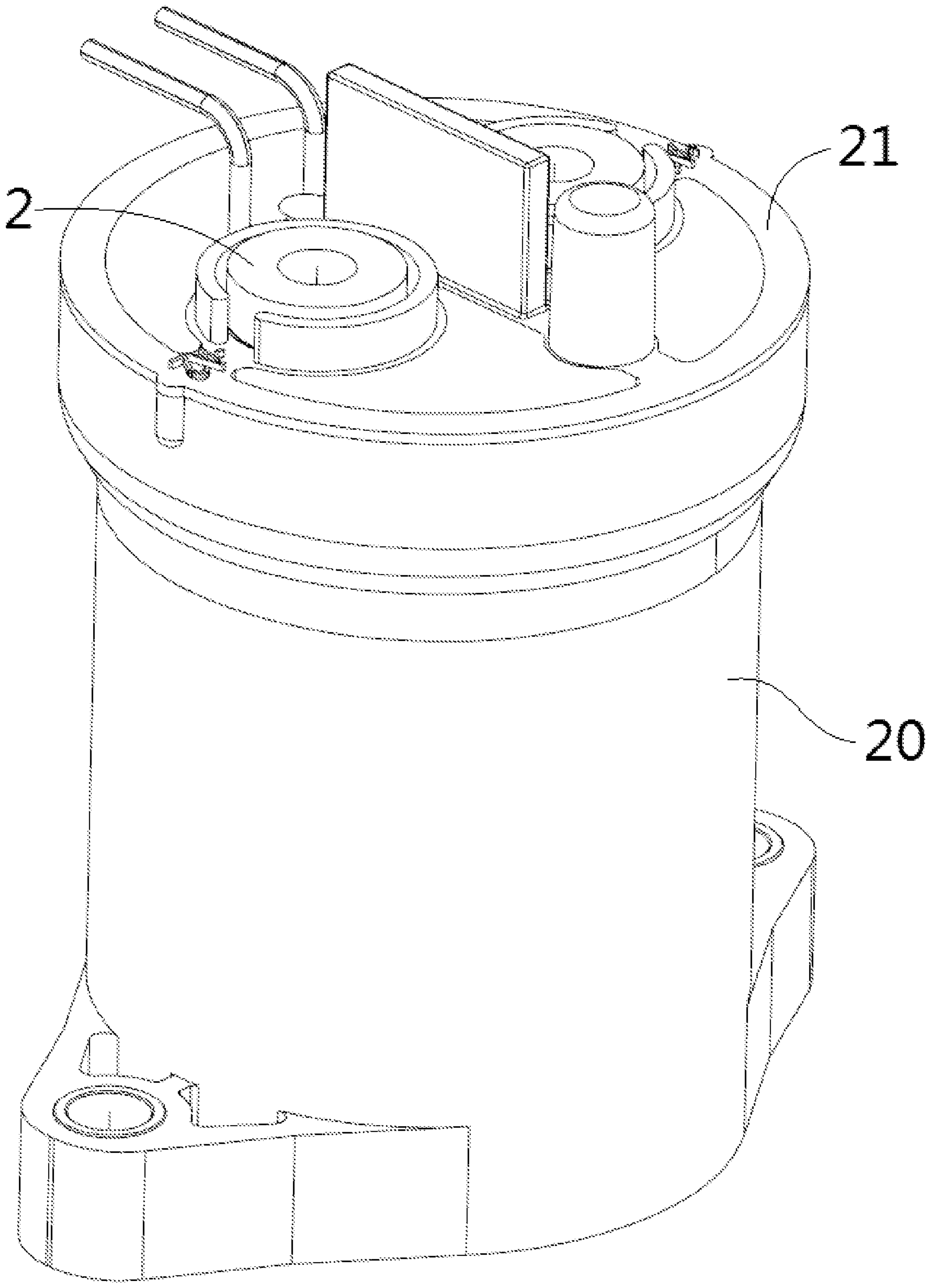
FIG. 1 is an illustrative perspective view of a contactor according to an exemplary embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A contactor according to an embodiment of the present disclosure comprises an insulation outer housing in which a pair of static terminals are provided. A movable terminal of the contactor is movably arranged within the insulation outer housing between a closed position in contact with the static terminal and an opened position separated from the static terminal. A first magnetic conductor of the contactor is fixed to the movable terminal to move synchronously with the movable terminal. A static bracket is provided in the insulation outer housing and is stationary relative to the insulation outer housing. A second magnetic conductor is movably provided in the static bracket. An elastic member is provided between the static bracket and the second magnetic conductor. The second magnetic conductor and the static terminal are arranged at the same side of the movable terminal, and the second magnetic conductor is supported in a floatable manner in the static bracket by the elastic member.

Figure 2:
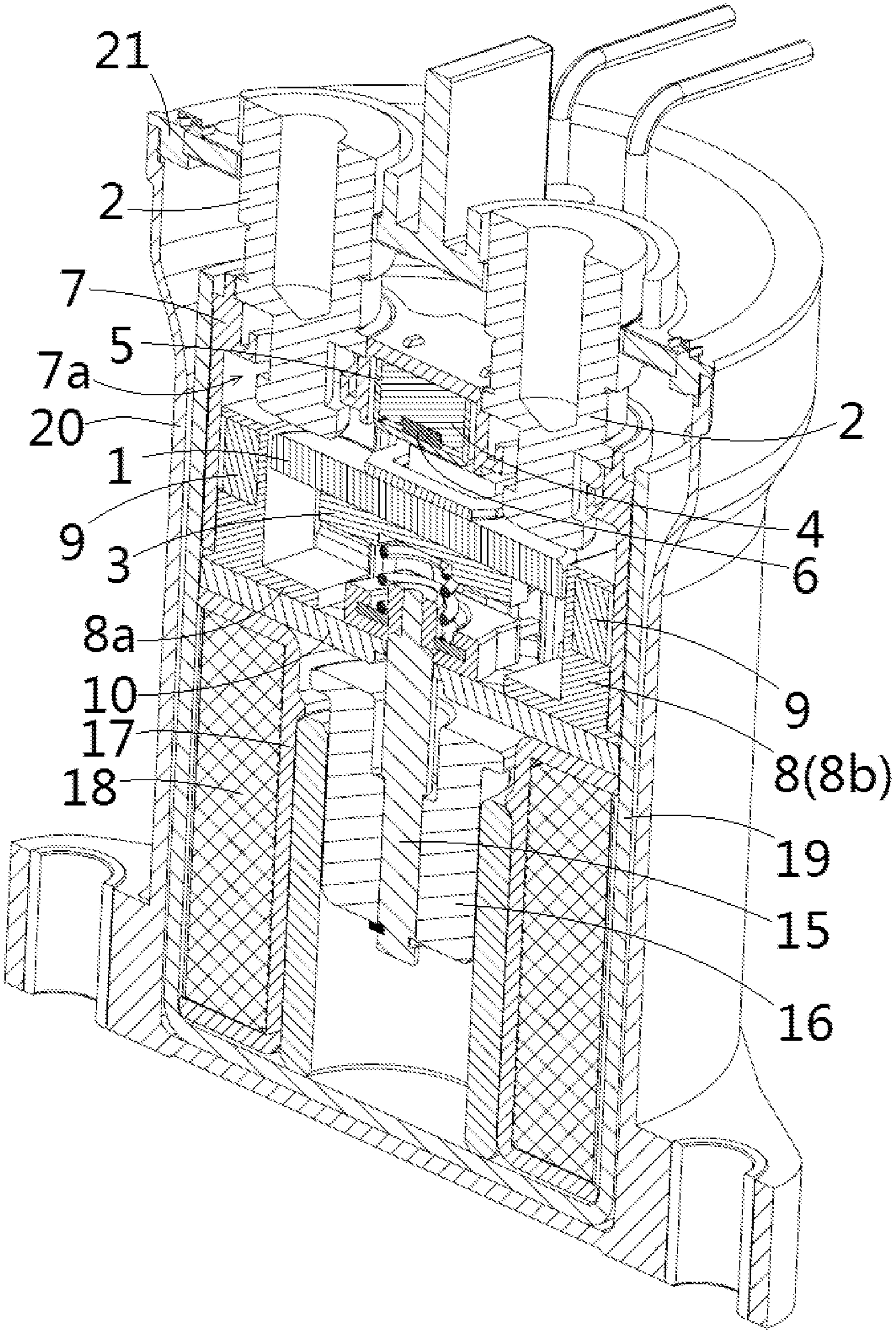
FIG. 2 is an axial cross-sectional view of a contactor according to an exemplary embodiment of the present invention.
Figure 3:
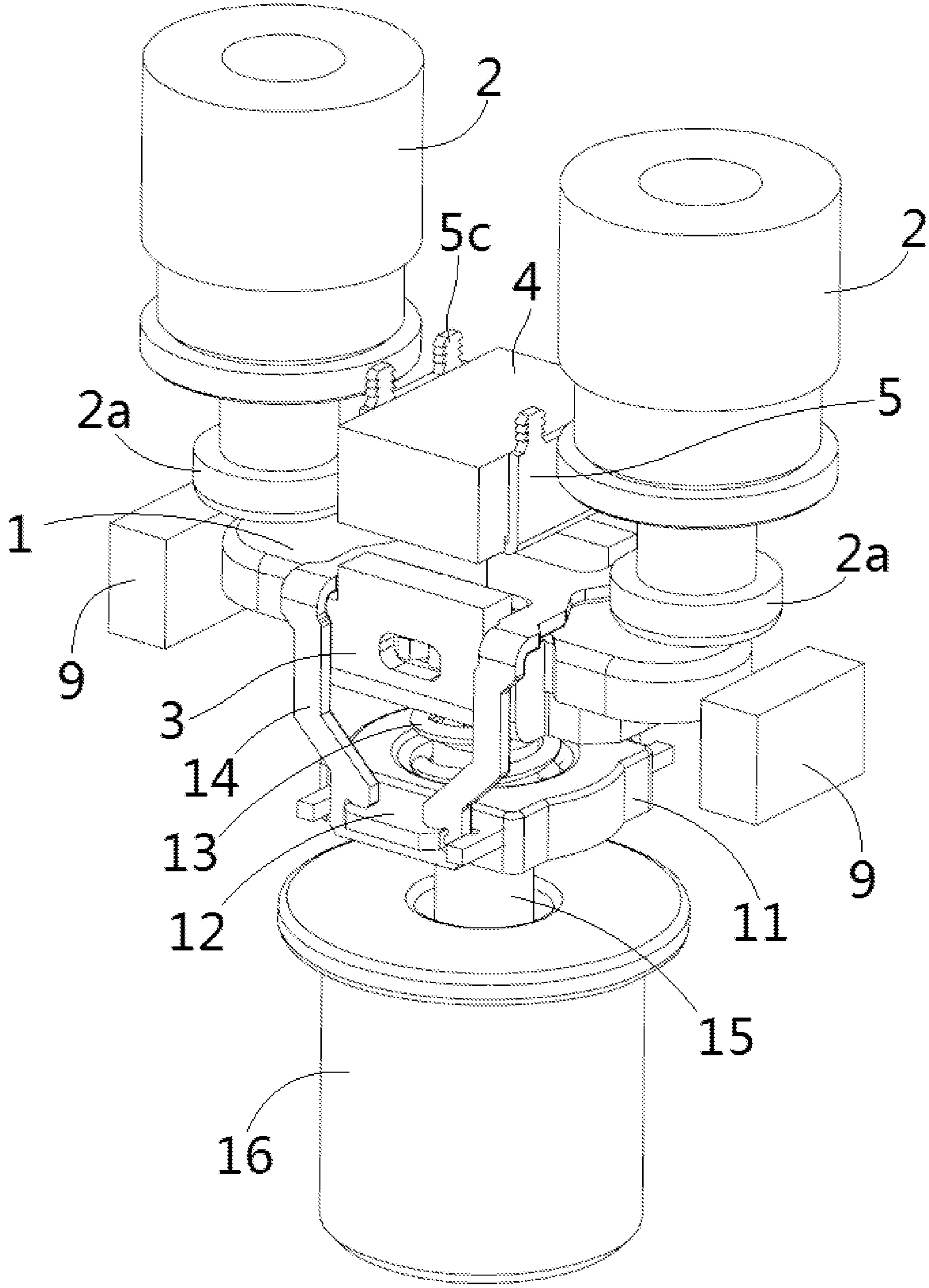
FIG. 3 is an illustrative perspective view of the static terminal, movable terminal assembly, and magnetic blowing magnet of a contactor according to an exemplary embodiment of the present invention.
Figure 4:
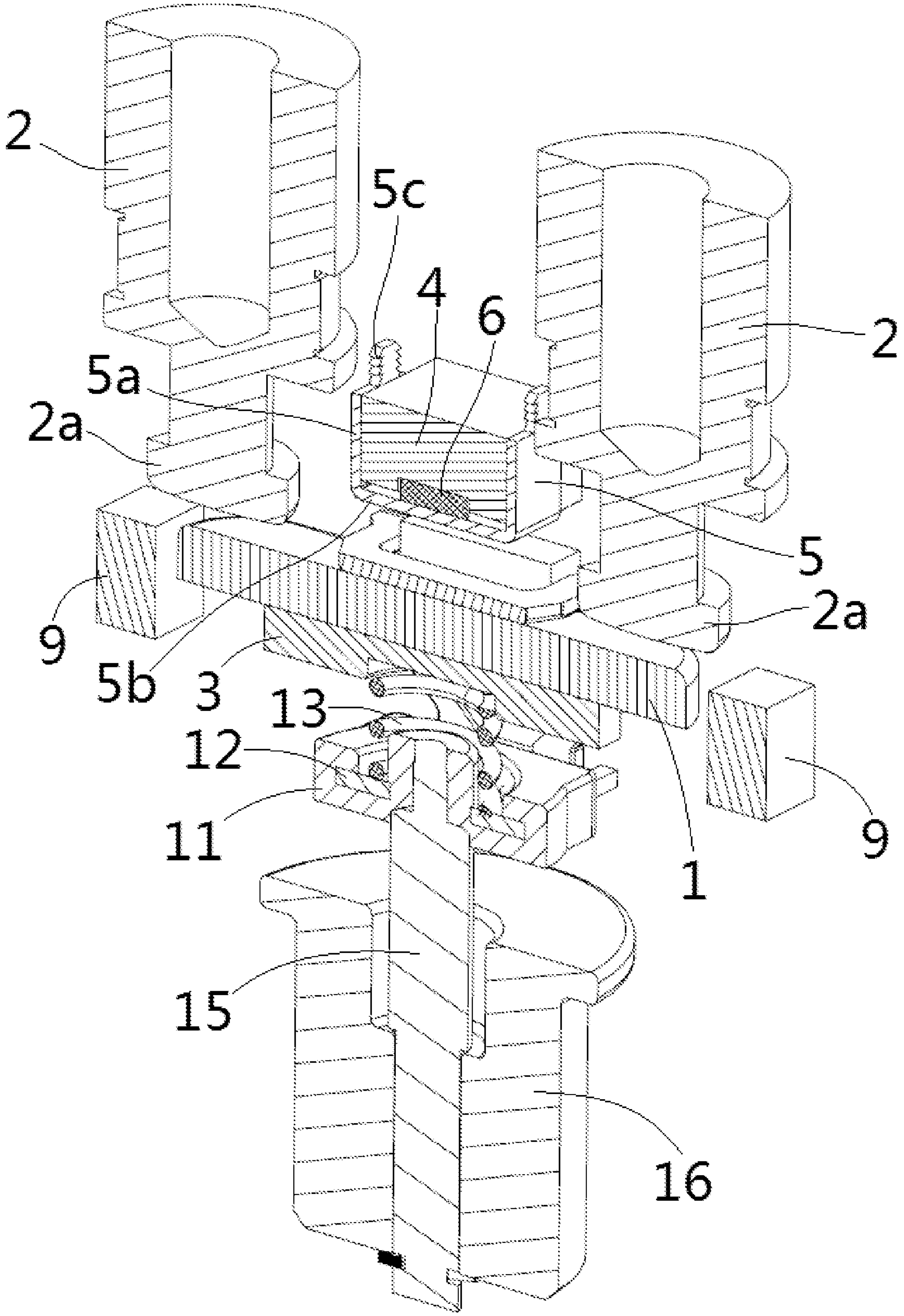
FIG. 4 is a cross-sectional view of the static terminal, movable terminal assembly, and magnetic blowing magnet of a contactor according to an exemplary embodiment of the present invention.

FIG. 1 is an illustrative perspective view of a contactor according to an exemplary embodiment of the present invention. FIG. 2 is an axial cross-sectional view of a contactor according to an exemplary embodiment of the present invention. FIG. 3 is an illustrative perspective view of the static terminal 2, movable terminal assembly, and magnetic blowing magnet 9 of a contactor according to an exemplary embodiment of the present invention. FIG. 4 is a cross-sectional view of the static terminal 2, movable terminal assembly, and magnetic blowing magnet 9 of a contactor according to an exemplary embodiment of the present invention.

As shown in FIGS. 1-4, in an exemplary embodiment of the present invention, a contactor is includes: an insulation outer housing 20, a pair of static terminals 2, a movable terminal 1, a first magnetic conductor 3, a static bracket 5, a second magnetic conductor 4, and an elastic member 6. The pair of static terminals 2 are arranged in the insulation outer housing 20 and stationary relative to the insulation outer housing 20. The movable terminal 1 is arranged in the insulation outer housing 20 and can be moved between a closed position in contact with the static terminal 2 and an opened position separated from the static terminal 2. The first magnetic conductor 3 is fixed to the movable terminal 1 to move synchronously with the movable terminal 1. The static bracket 5 is arranged in the insulation outer housing 20 and stationary relative to the insulation outer housing 20. The second magnetic conductor 4 is movably arranged in the static bracket 5. The elastic member 6 is arranged between the static bracket 5 and the second magnetic conductor 4.

As a current flows through the movable terminal 1 and the static terminal 2, the first and second magnetic conductors 3, 4 are magnetized and generate an electromagnetic attraction between them. The generated electromagnetic attraction increases as the current flowing through movable terminal 1 and static terminal 2 increases. Therefore, the second magnetic conductor 4 can be moved towards the first magnetic conductor 3 under the action of the generated electromagnetic attraction by overcoming the elastic force of the elastic member 6. In this way, the distance between the first magnetic conductor 3 and the second magnetic conductor 4 can decrease as the current flowing through the movable terminal 1 and the static terminal 2 increases.

The second magnetic conductor 4 and the static terminal 2 are arranged at the same side of the movable terminal 1. The second magnetic conductor 4 is floatably supported (i.e., supported in a floatable manner) in the static bracket 5 by the elastic member 6, such that the distance between the first magnetic conductor 3 and the second magnetic conductor 4 is inversely proportional to the current flowing through the movable terminal 1 and the static terminal 2. That is, as the current flowing through the movable terminal 1 and the static terminal 2 increases, the distance between the first magnetic conductor 3 and the second magnetic conductor 4 will decrease. When the current flowing through the movable terminal 1 and the static terminal 2 decreases, the distance between the first magnetic conductor 3 and the second magnetic conductor 4 will increase. Therefore, when the current flowing through the movable terminal 1 and the static terminal 2 does not exceed a predetermined value (such as 1 kA), the distance between the first magnetic conductor 3 and the second magnetic conductor 4 is relatively large. This results in a smaller electromagnetic attraction applied between the movable terminal 1 and the static terminal 2 by the first magnetic conductor 3 and the second magnetic conductor 4, which will not affect the normal connection and disconnection operation of the contactor. However, when the current flowing through the movable and static terminals far exceeds the predetermined value, such as reaching 10 kA, the distance between the first magnetic conductor 3 and the second magnetic conductor 4 becomes very small. This condition results in a very large electromagnetic attraction applied between the movable and static terminals 1 and 2 by the first magnetic conductor 3 and the second magnetic conductor 4, improving the ability of the contactor to withstand the short circuit current.

In the illustrated embodiments, the static bracket 5 includes a bottom plate **5*b*, a side plate 5*a* and an inner cavity defined by the bottom plate 5*b* and the side plate 5*a*. The second magnetic conductor 4 is accommodated in the inner cavity of the static bracket 5. The elastic member 6 is compressed between the second magnetic conductor 4 and the bottom plate 5*b* of the static bracket 5**.

A guide rib (extending vertically is formed on one of the side plate **5*b* of the static bracket 5 and the side face of the second magnetic conductor 4, and a guide groove is formed on the other of the side plate 5*b* of the static bracket 5 and the side face of the second magnetic conductor 4. The guide rib is mated with the guide groove to guide the second magnetic conductor 4 to move vertically relative to the static bracket 5**.

The contactor further includes an insulation inner housing 7, which is arranged in the insulation outer housing 20 and has an inner chamber served as an arc extinguishing chamber **7*a*. The static terminal 2 is fixed to the insulation inner housing 7 and extends into the arc extinguishing chamber 7*a*. The static bracket 5 is located in the arc extinguishing chamber 7*a* and is fixed to the insulation inner housing 7**.

The static bracket 5 further includes a connecting part **5*c*, which is connected to the upper side of the side plate 5*a* and extends upwards. A hole is formed on the insulation inner housing 7, and the connecting part 5*c* is inserted into the hole of the insulation inner housing 7 to fix the static bracket 5 to the insulation inner housing 7. In the illustrated embodiment, a barbed protrusion is formed on the connecting part 5*c*, and the barbed protrusion on the connecting part 5*c* is in an interference fit with the hole wall of the hole of the insulation inner housing 7. This prevents the connection part 5*c*** from being pulled out.

The elastic member 6 and the second magnetic conductor 4 are located in the arc extinguishing chamber **7*a* and are detachably assembled together. For example, an installation slot is formed on the second magnetic conductor 4. The elastic member 6 is embedded in the installation slot of the second magnetic conductor 4. In an exemplary embodiment of the present invention, the elastic member 6 can be a spring or an elastic block. For example, the elastic element 6** can be a spiral spring or an elastic body made of elastic material. A cavity structure can be formed inside the elastic body, for example, to increase the elasticity of the elastic body.

The contactor further includes a pair of magnetic blowing magnets 9, which are arranged in the arc extinguishing chamber **7*a* and stationary relative to the static terminal 2. The static terminal 2 has a contact end 2*a* for contact with the movable terminal 1. The pair of magnetic blowing magnets 9 are respectively arranged adjacent to the contact ends 2*a* of the pair of static terminals 2. A magnetic field intensity generated by the magnetic blowing magnet 9 itself at the contact end 2*a* of the static terminal 2 adjacent to the magnetic blowing magnet 9 is higher than a predetermined magnetic field intensity. This extinguishes an electric arc between the movable terminal 1 and the static terminal 2** through magnetic blowing. The direction of the electromagnetic force exerted by the magnetic field generated by the magnetic blowing magnet 9 on the electric arc between the static terminal 2 and the movable terminal 1 is horizontal.

One of the magnetic blowing magnets 9 is adjacent to the contact end 2*a* of one static terminal 2, and the other magnetic blowing magnet 9 is adjacent to the contact end 2*a* of the other static terminal 2. The direction of the electromagnetic force exerted by the magnetic field generated by one magnetic blowing magnet 9 on the electric arc between one static terminal 2 and the movable terminal 1 is the first horizontal direction. The direction of the electromagnetic force exerted by the magnetic field generated by the other magnetic blowing magnet 9 on the electric arc between the other static terminal 2 and the movable terminal 1 is the first horizontal direction or a second horizontal direction opposite to the first horizontal direction.

The contactor also includes an insulation end cap 8. The insulation end cap 8 includes a cover plate 8*a* and a pair of support parts 8*b*. The cover plate 8*a* is installed onto the bottom opening of the insulation inner housing 7. The pair of support parts 8*b* are connected to the cover plate 8*a* and located in the arc extinguishing chamber 7*a*. The pair of magnetic blowing magnets 9 are respectively fixed to the pair of support parts 8*b* of insulation end caps 8. In the illustrated embodiment, a recess is formed on the support part 8*b*, and the magnetic blowing magnet 9 is embedded in the recess on the support part 8*b*.

In the illustrated embodiments, the contactor further includes an insulation base 11, a support substrate 12, a contact spring 13, and a limit bracket 14. The insulation base 11 is located in the arc extinguishing chamber 7*a* and supported on the cover plate 8*a* of the insulation end cap 8. The support substrate 12 is fixed to the insulation base 11. The contact spring 13 is compressed between the second magnetic conductor 4 and the support substrate 12 to provide a contact force between the movable terminal 1 and the static terminal 2. The limit bracket 14 is fixed to the support substrate 12 to limit the movement direction and distance of the movable terminal 1 relative to the support substrate 12.

The contactor further includes a drive shaft 15, and the upper end of the drive shaft 15 extends into the arc extinguishing chamber 7*a* and is fixed to the insulation base 11. The insulation base 11 electrically isolates the drive shaft 15 from the support substrate 12. The insulation base 11 is an injection molded part formed on the support substrate 12 and drive shaft 15, so that the insulation base 11, the support substrate 12 and the drive shaft 15 are formed into an integral piece. The contactor further comprises a magnetic core 16, which is formed with a central through hole. The drive shaft 15 passes through the central through hole of the magnetic core 16 and is connected to the magnetic core 16.

Still referring generally to FIGS. 1-4, the contactor further comprises a coil skeleton 17, a coil 18, and a magnetic plate 10. The coil skeleton 17 is installed in the insulation outer housing 20. The coil 18 is wound around the coil skeleton 17. The magnetic plate 10 is supported on the top of the coil skeleton 17. The magnetic core 16 is movably arranged in the coil skeleton 17, and the cover plate 8*a* of the insulation end cap 8 is supported on the top surface of the magnetic plate 10. When the coil 18 is energized, the drive shaft 15 drives the movable terminal 1 from the opened position to the closed position under the action of electromagnetic force.

The contactor also includes a return spring. The return spring is compressed between the magnetic core 16 and the magnetic plate 10. When the coil 18 is deenergized, the drive shaft 15 drives the movable terminal 1 from the closed position to the opened position under the elastic return force of the return spring.

The contactor further includes a metal inner shell 19. The inner shell 19 is arranged in the insulation outer housing 20. The insulation inner housing 7, insulation end cap 8, magnetic plate 10, coil skeleton 17, and coil 18 are accommodated in the metal inner shell 19. The contactor also includes an insulated top cover 21. The insulation top cover 21 is installed on the top opening of the insulation outer housing 20. The pair of static terminals 2 extend to the outside of the insulated top cover 21 for electrical connection to connecting terminals (not shown).

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A contactor, comprising:

an insulation outer housing;

a pair of static terminals arranged in the insulation outer housing and stationary relative to the insulation outer housing;

a movable terminal arranged in the insulation outer housing and movable between a closed position in contact with the static terminal and an opened position separated from the static terminal;

a first magnetic conductor fixed to the movable terminal to move synchronously with the movable terminal;

a static bracket including a bottom plate, a side plate, and an inner cavity defined by the bottom plate and the side plate and arranged in the insulation outer housing and stationary relative to the insulation outer housing, and further comprising a connecting part connected to an upper side of the side plate and extending upwards;

a second magnetic conductor movably arranged and accommodated in the inner cavity of the static bracket; and an elastic member compressed between the bottom plate of the static bracket and the second magnetic conductor, the second magnetic conductor and the static terminal are arranged at the same side of the movable terminal, and the second magnetic conductor is floatably or movably supported in the static bracket by the elastic member; and an insulation inner housing arranged in the insulation outer housing and having an inner space defining an arc extinguishing chamber and a hole through which the connecting part of the static bracket is inserted to fix the static bracket to the insulation inner housing, the static terminal is fixed to the insulation inner housing and extends into the arc extinguishing chamber, the static bracket is located in the arc extinguishing chamber and is fixed to the insulation inner housing.

2. The contactor according to claim 1, wherein the second magnetic conductor is guided vertically within the static bracket.

3. The contactor according to claim 1, wherein a barbed protrusion is formed on the connecting part and forms an interference fit with the hole wall of the hole of the insulation inner housing.

4. The contactor according to claim 1, wherein the elastic member and the second magnetic conductor are located in the arc extinguishing chamber and are detachably assembled together.

5. The contactor according to claim 1, further comprising a pair of magnetic blowing magnets arranged in the arc extinguishing chamber and fixed relative to the static terminal, wherein:

the static terminal has a contact end adapted to contact the movable terminal, and the pair of magnetic blowing magnets are respectively adjacent to the contact ends of the pair of static terminals; and a magnetic field intensity generated by the magnetic blowing magnet at the contact end of the static terminal adjacent to the magnetic blowing magnet is higher than a predetermined magnetic field intensity.

6. The contactor according to claim 5, wherein a direction of the electromagnetic force applied to the electric arc between the static terminal and the movable terminal by the magnetic field generated by the magnetic blowing magnet itself is horizontal.

7. The contactor according to claim 6, wherein:

one magnetic blowing magnet is adjacent to the contact end of one static terminal, and the other magnetic blowing magnet is adjacent to the contact end of the other static terminal;

the direction of the electromagnetic force applied to the electric arc between the one static terminal and the movable terminal by the magnetic field generated by the one magnetic blowing magnet itself is a first horizontal direction; and the direction of the electromagnetic force applied to the electric arc between the other static terminal and the movable terminal by the magnetic field generated by the other magnetic blowing magnet itself is the first horizontal direction or a second horizontal direction opposite to the first horizontal direction.

8. The contactor according to claim 5, further comprising an insulation end cap including:

a cover plate arranged on a bottom opening of the insulation inner housing; and a pair of support parts connected to the cover plate and positioned in the arc extinguishing chamber, the pair of magnetic blowing magnets are respectively fixed to the pair of support parts of the insulation end cap.

9. The contactor according to claim 8, wherein a recess is formed on the support part, and the magnetic blowing magnet is embedded in the recess.

10. The contactor according to claim 8, further comprising:

an insulation base located in the arc extinguishing chamber and supported on the cover plate of the insulation end cap;

a support substrate fixed to the insulation base;

a contact spring compressed between the second magnetic conductor and the support substrate and adapted to provide a contact force between the movable terminal and the static terminal; and a limit bracket fixed to the support substrate and adapted to limit the movement direction and distance of the movable terminal relative to the support substrate.

11. The contactor according to claim 10, further comprising a drive shaft fixed to the insulation base and having an upper end extending into the arc extinguishing chamber, the insulation base electrically isolates the drive shaft from the support substrate.

12. The contactor according to claim 11, wherein the insulation base is an injection molded part formed on the support substrate and the drive shaft, the insulation base, the support substrate and the drive shaft are formed into an integral piece.

13. The contactor according to claim 11, further comprising a magnetic core formed with a central through hole, the drive shaft passes through the central through hole of the magnetic core and is connected to the magnetic core.

14. The contactor according to claim 13, further comprising:

a coil skeleton installed in the insulation outer housing and in which the magnetic core is arranged;

a coil wound around the coil skeleton; and a magnetic plate supported on the top of the coil skeleton, the cover plate of the insulation end cap is supported on the top surface of the magnetic plate, wherein when the coil is energized, the drive shaft drives the movable terminal from the opened position to the closed position under the action of electromagnetic force.

15. The contactor according to claim 14, further comprising a return spring compressed between the magnetic core and the magnetic plate, wherein when the coil is deenergized, the drive shaft drives the movable terminal from the closed position to the opened position under the elastic return force of the return spring.

16. The contactor according to claim 15, further comprising a metal inner shell arranged in the insulation outer housing, and in which the insulation inner housing, the insulation end cap, the magnetic plate, the coil skeleton, and the coil are arranged.

* * * * *